(12) United States Patent
Matsumoto

(10) Patent No.: US 10,955,817 B2
(45) Date of Patent: Mar. 23, 2021

(54) NUMERICAL CONTROLLER

(71) Applicant: Fanuc Corporation, Yamanashi (JP)

(72) Inventor: Eiji Matsumoto, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 0 days.

(21) Appl. No.: 16/511,677

(22) Filed: Jul. 15, 2019

(65) Prior Publication Data

US 2020/0026259 A1    Jan. 23, 2020

(30) Foreign Application Priority Data

Jul. 17, 2018   (JP) .............................. JP2018-134512

(51) Int. Cl.
*G05B 19/4069*   (2006.01)
*B21D 28/34*   (2006.01)

(52) U.S. Cl.
CPC ....... *G05B 19/4069* (2013.01); *B21D 28/343* (2013.01); *G05B 2219/50297* (2013.01)

(58) Field of Classification Search
CPC ........ G05B 19/4069; G05B 2219/5097; B21D 28/343
See application file for complete search history.

(56) References Cited

U.S. PATENT DOCUMENTS

| | | | | |
|---|---|---|---|---|
| 5,317,518 A | * | 5/1994 | Fujita ................... | B23Q 1/0009 700/175 |
| 5,983,688 A | * | 11/1999 | Anzai ..................... | B21D 5/02 72/15.1 |
| 2002/0016647 A1 | * | 2/2002 | Bourne .................... | B21D 5/02 700/165 |
| 2004/0019402 A1 | * | 1/2004 | Bourne ............ | G05B 19/41825 700/165 |
| 2008/0120566 A1 | * | 5/2008 | Iwashita ............ | G05B 19/4069 715/771 |
| 2016/0048616 A1 | * | 2/2016 | Nagata ............... | G05B 19/4069 703/7 |
| 2017/0010600 A1 | * | 1/2017 | Shimizu ............... | G05B 19/404 |
| 2017/0212483 A1 | * | 7/2017 | Tanaka ............... | G05B 19/4069 |
| 2017/0308057 A1 | * | 10/2017 | Kreidler ............. | G05B 19/4069 |

FOREIGN PATENT DOCUMENTS

| | | |
|---|---|---|
| JP | 58062702 A | 4/1983 |
| JP | 63257006 A | 10/1988 |
| JP | 04205005 A | 7/1992 |
| JP | 2000-158055 A | 6/2000 |
| JP | 2003019641 A | 1/2003 |
| JP | 2010044489 A | 2/2010 |

OTHER PUBLICATIONS

Notice of Reasons for Refusal for Japanese Application No. 2018-134512, dated May 26, 2020, with translation, 8 pages.

* cited by examiner

*Primary Examiner* — Omar Flores Sanchez
(74) *Attorney, Agent, or Firm* — RatnerPrestia

(57) ABSTRACT

A numerical controller controlling punching performs punching according to a machining program, detects a phenomenon that the punching is not normally completed, collects and stores information required for re-execution of a block in which the phenomenon is generated, and restores a machining state at the time of occurrence of the phenomenon and further re-executes the punching by using the information.

4 Claims, 6 Drawing Sheets

NUMERICAL CONTROLLER

RELATED APPLICATIONS

The present application claims priority to Japanese Patent Application Number 2018-134512 filed on Jul. 17, 2018, the disclosure of which is hereby incorporated by reference herein in its entirety.

BACKGROUND OF THE INVENTION

Field of the Invention

The present invention relates to a numerical controller, and more particularly, to a numerical controller configured to support re-machining after punching.

Description of the Related Art

In machining using a punch press machine, each workpiece is punched (or drilled) a lot of times, in many cases. During many punching cycles, a phenomenon (hereinafter simply referred to as the error) may occur that punching actually cannot be performed in a spot to be originally punched, due to some external factor. As an example of the external factor, a punch tool is brought to a press-lock state by a burden thereto.

For example, Japanese Patent Application Laid-Open No. 2000-158055 teaches an automatic drilling device that determines the occurrence of the error by detecting the amount of movement of a punch by means of a position sensor, such as a limit switch, or detecting the punch penetrating a workpiece and getting into a punch hole.

If an error is generated in punching, either of the following measures will be typically taken. One of the measures is to discard the workpiece as defective. Another measure is to re-machine a spot where the error is generated, that is, a spot to be originally punched.

If workpieces are discarded, they cause a waste of material and the yield rate is reduced. In re-machining the error spot, an operator generally identifies the position coordinates of the location of occurrence of the error and the state (such as selected tool) during the machining and manually performs the re-machining. Thus, there is a problem that a heavy burden is imposed on the operator.

SUMMARY OF THE INVENTION

The present invention is to solve the above problem and has an object to provide a numerical controller configured to support re-machining after punching.

A numerical controller performing the punching according to the present invention comprises a punching executor according to a machining program; a punching error detector detecting a phenomenon that the punching is not normally completed; a re-punching information storage collecting and storing information required for re-execution of a block that the phenomenon is generated; and a re-punching executor restoring a machining state at the time of occurrence of the phenomenon and re-executing the punching by using the information.

In the numerical controller according to one embodiment of the present invention, the information includes a selected tool and/or end point coordinates of the block that the phenomenon is generated.

In the numerical controller according to one embodiment of the present invention, the re-punching information storage collects and stores the information related to a plurality of blocks that the phenomenon is generated during the punching by the punching executor, and wherein the re-punching executor re-executes the punching for that one of the plurality of blocks selected by a user.

In the numerical controller according to one embodiment of the present invention, the re-punching executor re-executes the punching after suspension or termination of the punching by the punching executor.

According to the present invention, there can be provided a numerical controller configured to support re-machining after punching.

BRIEF DESCRIPTION OF THE DRAWINGS

The above and other objects and features of the present invention will become apparent from the ensuing description of embodiments with reference to the accompanying drawings, in which.

DETAILED DESCRIPTION OF THE PREFERRED EMBODIMENTS

Figure 1:
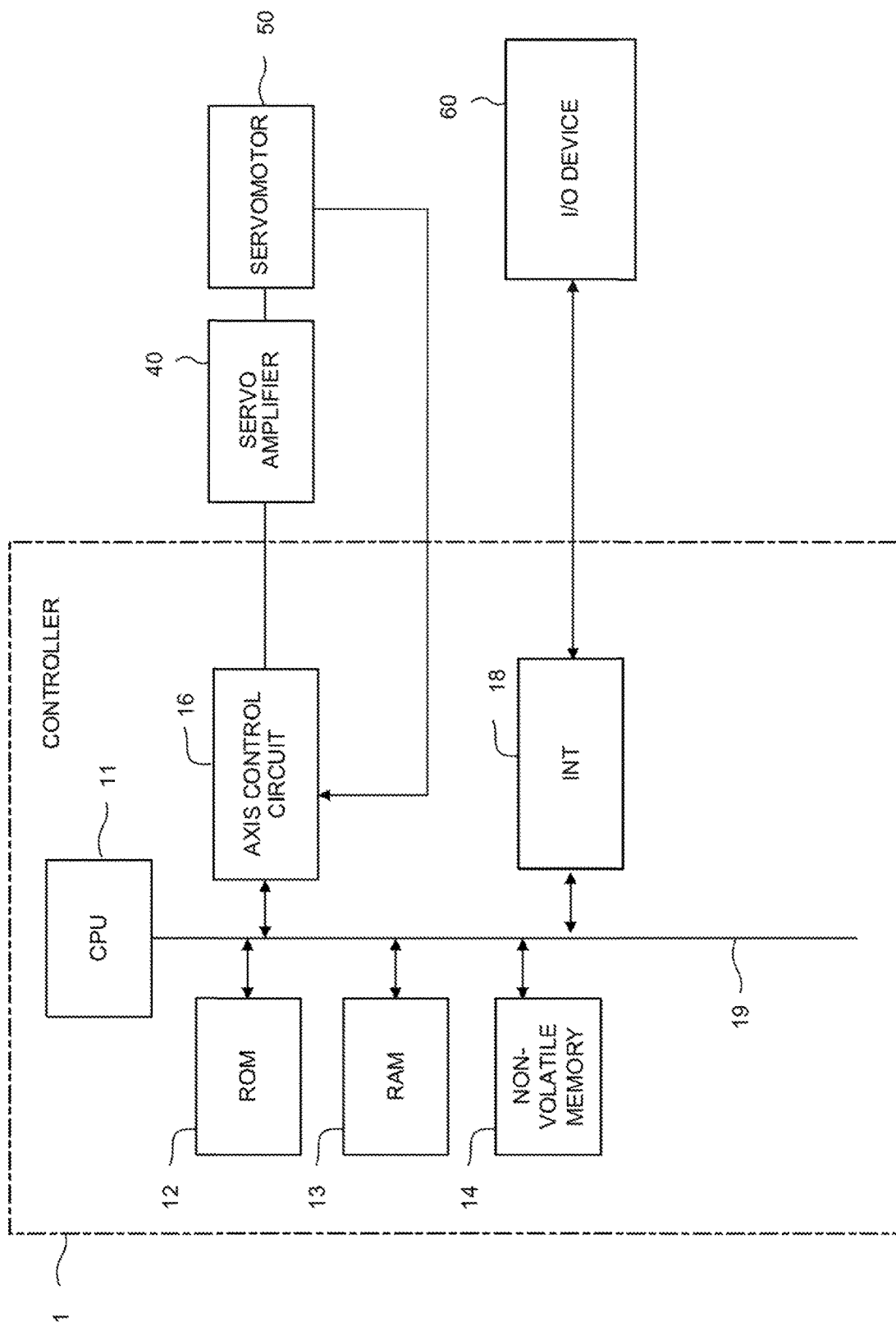
FIG. 1 is a diagram showing a hardware configuration example of a numerical controller.

FIG. 1 is a schematic hardware configuration diagram showing principal parts of a numerical controller 1 according to one embodiment of the present invention. The numerical controller 1 is a device for controlling a punch press machine (hereinafter referred to as the punch press) that performs punching. The numerical controller 1 comprises a CPU (Central Processing Unit) 11, a ROM (Read Only Memory) 12, a RAM (Random Access Memory) 13, a non-volatile memory 14, an axis control circuit 16, an interface 18 and a bus 19. The numerical controller 1 is connected with a servo amplifier 40, a servomotor 50, and an input/output (I/O) device 60.

The CPU 11 is a processor for generally controlling the numerical controller 1. The CPU 11 reads out a system program stored in the ROM 12 via the bus 19 to control the entire numerical controller 1 according to the system program.

The ROM 12 is previously loaded with system programs for executing various controls of the punch press.

The RAM 13 is temporarily loaded with temporary calculation and display data, data and programs input by an operator through the input/output device 60 (described later), and the like.

The non-volatile memory 14 is backed up by, for example, a battery (not shown) so that its storage state can be maintained even when the numerical controller 1 is switched off. The non-volatile memory 14 stores data, programs and the like, which are input through the input/output device 60. The programs and data stored in the non-volatile memory 14 may be developed in the RAM 13 during execution and use.

The axis control circuit 16 controls the motion axes of the punch press. The axis control circuit 16 receives a movement command amount for each axis output by the CPU 11 and outputs a movement command for the each axis to the servo amplifier 40.

The servo amplifier 40 drives the servomotor 50 on receiving the axis movement command output by the axis control circuit 16.

The servomotor 50 is driven by the servo amplifier 40 to move the motion axes of the punch press. The servomotor 50 typically has position and speed detectors (not shown) built-in. The detectors output position/speed feedback signals. These signals are fed back to the axis control circuit 16, thereby position and speed feedback controls are performed.

In FIG. 1, the numerical controller 1 is illustrated as comprising only a set of elements including the axis control circuit 16, the servo amplifier 40 and the servomotor 50. Actually, however, the sets are provided corresponding in number to the axes of the punch press to be controlled.

The input/output device 60 is a data input/output device equipped with a display, hardware keys and so on, and is typically a control panel. The input/output (I/O) device 60 displays information received from the CPU 11 through the interface 18 on the display. The input/output device 60 delivers commands and data input from the hardware keys and the like to the CPU 11 through the interface 18.

Figure 2:
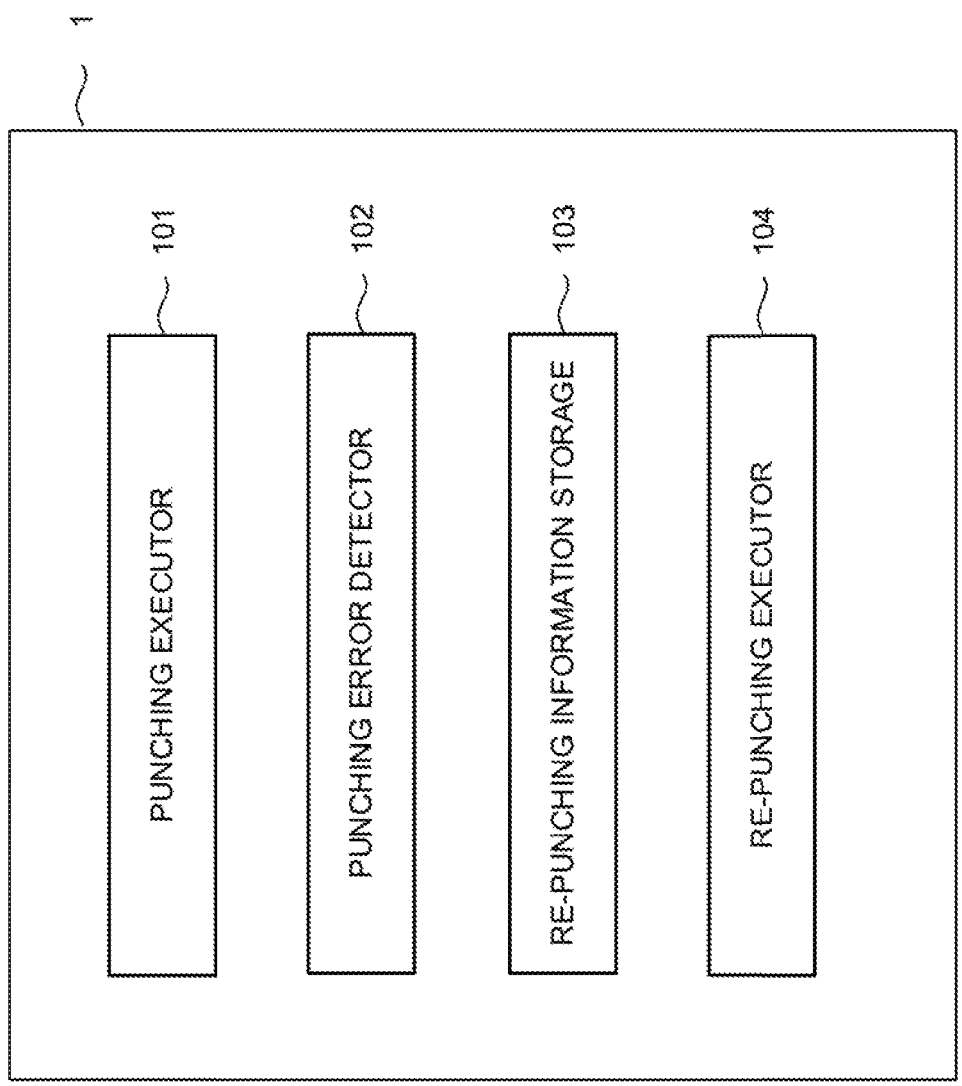
FIG. 2 is a diagram showing a functional configuration example of the numerical controller.

FIG. 2 is a block diagram showing a schematic functional configuration of the numerical controller 1 according to one embodiment of the present invention. The numerical controller 1 comprises a punching executor 101, a punching error detector 102, a re-punching information storage 103, and a re-punching executor 104.

The punching executor 101 performs punching according to a machining program.

The punching error detector 102 detects an error generated while the punching executor 101 is performing the punching. Because a method of error detection is generally known, it is not described in detail herein. For example, the technique described in Japanese Patent Application Laid-Open No. 2000-158055 can be used for this purpose.

Moreover, the punching error detector 102 according to the present embodiment comprises a counter that indicates the result of the error detection. The counter is operated depending on whether the punching is completed (in success) or led to an error with every execution of each block.

Specifically, the punching error detector 102 increments the counter by 1 at the start of the block for punching and decrements the counter by 1 or resets (or updates) it to 0 if the punching is normally completed. If the punching is erroneous, in contrast, the punching error detector 102 does not operate the counter. Thus, if the counter is at 0 at the start of the next block, then the operation of the previous block is normally completed. If the counter is at any other value than 0 at the start of the next block, in contrast, then an error is generated in the previous block.

The re-punching information storage 103 stores various pieces of information (block end point coordinates, selected tool number, etc.) required for re-execution of a block in which an error is generated.

If the value of the aforesaid counter is found to be any other value than 0 by reference before the start of the next block, for example, the re-punching information storage 103 stores the information (end point coordinates, selected tool number, etc.) related to the previous block into a predetermined storage area. Thereafter, the re-punching information storage 103 decrements the counter by 1 or resets it.

The re-punching executor 104 performs re-punching in a spot where an error is generated. Preferably, the re-punching executor 104 should notify a user of the occurrence of the error, accept the user's start-up operation for re-punching, and perform the re-punching.

Figure 6:
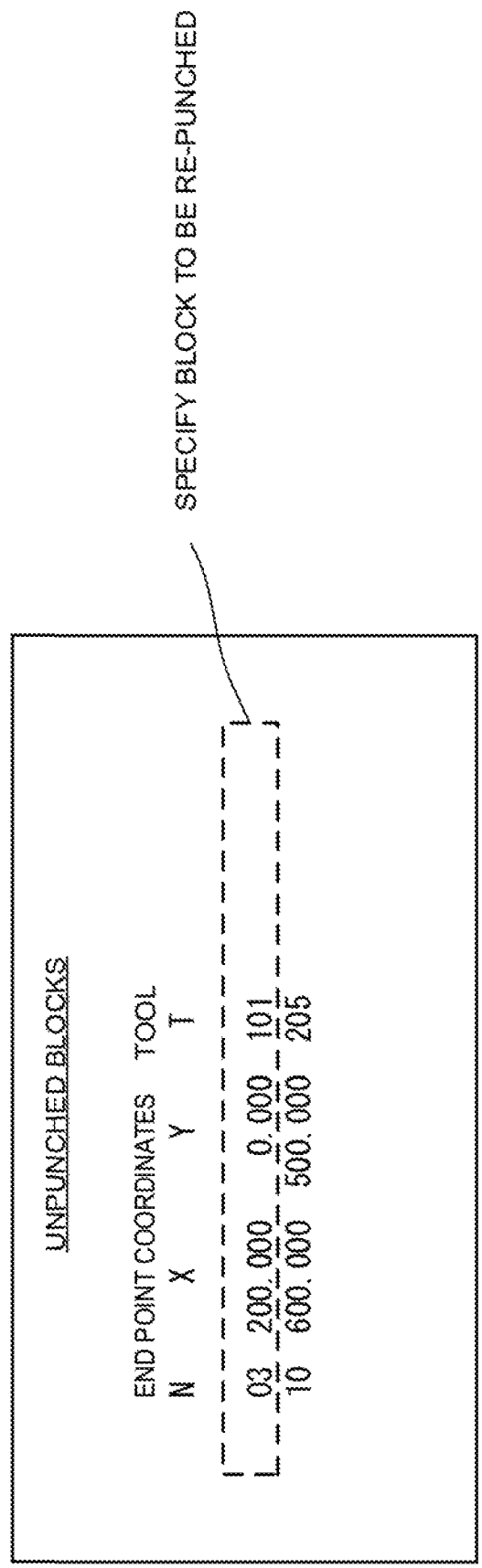
FIG. 6 shows an example of a list of error-generated blocks and a selection screen.

Typically, the re-punching executor 104 notifies the user of the occurrence of the error after suspension of machining (more specifically, feed hold) or termination of machining. In doing this, the re-punching executor 104 presents the user with the various pieces of information (end point coordinates, selected tool number, etc.) on the error-generated blocks stored by the re-punching information storage 103. If errors are generated in a plurality of blocks, the re-punching executor 104 may display these pieces of block information as a list on an NC screen so that the user can select one or more blocks to be re-executed because the plurality of pieces of information are stored. FIG. 6 shows an example of the display screen for error-generated blocks. In this case, two blocks are displayed in a state such that one (upper one) of them is selected by the user. The re-punching executor 104 executes the selected block.

The re-punching can be performed in an arbitrary timing. If the re-punching is performed after the suspension or termination of machining, as mentioned before, the machining accuracy provides an advantage, that is, it can be maintained at a high level. Otherwise, the machining time provides an advantage, that is, it can be reduced, if the re-punching is performed at the time of tool change. Moreover, execution of a process subject to the user's instruction, as described above, is also arbitrary. Thus, the re-punching executor 104 may automatically perform the re-punching at any time after the occurrence of the error.

<Operation at Time of Occurrence of Error>

Figure 5:
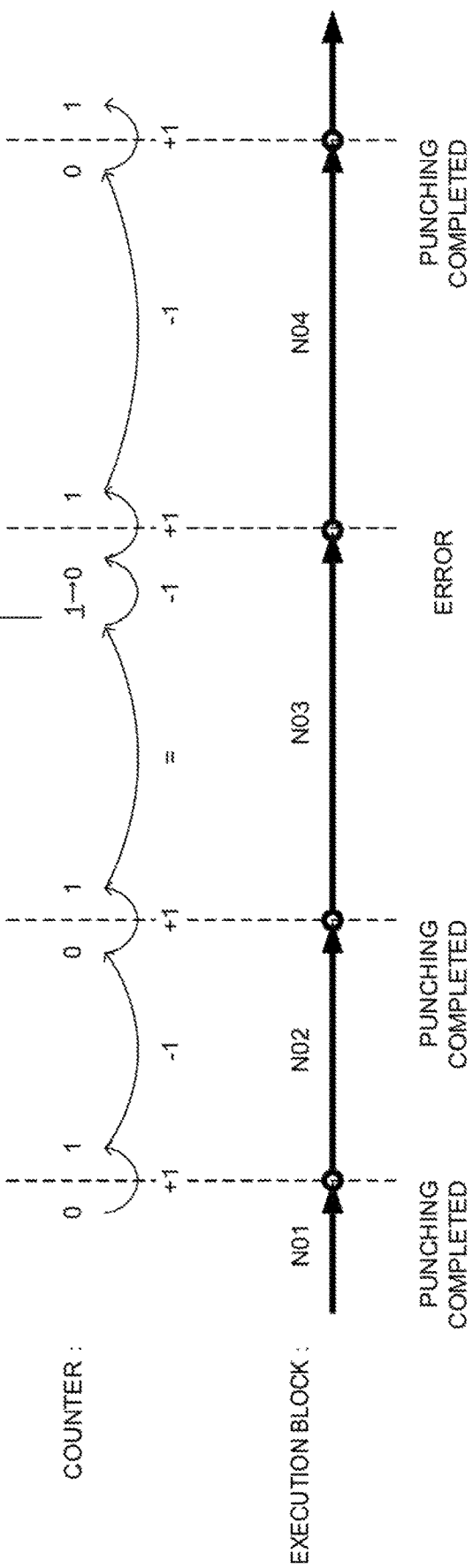
FIG. 5 is a diagram illustrating an example of the behavior of a counter indicative of the result of error detection.

The behavior of the counter that indicates the result of the error detection will be described based on a specific example with reference to FIG. 5. Now let us assume that punching in a block N01 is performed and normally completed. Thereupon, the counter value immediately before the execution of the next block N02 is 0.

The punching executor 101 starts punching in the block N02. Prior to the execution, the re-punching information storage 103 refers to the counter and confirms that its value is 0, and the punching error detector 102 increments the counter by 1. When the punching is normally completed, the punching error detector 102 decrements the counter by 1. The counter value immediately before the execution of the next block N03 is 0.

The punching executor 101 starts punching in the block N03. Prior to the execution, the re-punching information storage 103 refers to the counter and confirms that its value is 0, and the punching error detector 102 increments the counter by 1. Now let us assume that the punching is subjected to an error. Because the punching error detector 102 does not operate the counter, the counter value immediately before the execution of the next block N03 is still 1.

The punching executor 101 starts punching in a block N04. Prior to the execution, the re-punching information storage 103 refers to the counter and detects that its value is not 0 or is 1. Thereupon, the re-punching information storage 103 acquires and stores information (end point coordinates, selected tool number, etc.) related to the previous block N03 into the predetermined storage area. In this stage, the execution of the next block N04 is not started yet, so that the re-punching information storage 103 can acquire the information related to the previous block N03. The re-punching information storage 103 decrements the counter by 1 to restore the same state as the normal completion. The punching error detector 102 increments the counter by 1. When the punching is normally completed by the punching executor 101, the punching error detector 102 decrements the counter by 1. The counter value immediately before the execution of the next block is 0.

Figure 3:
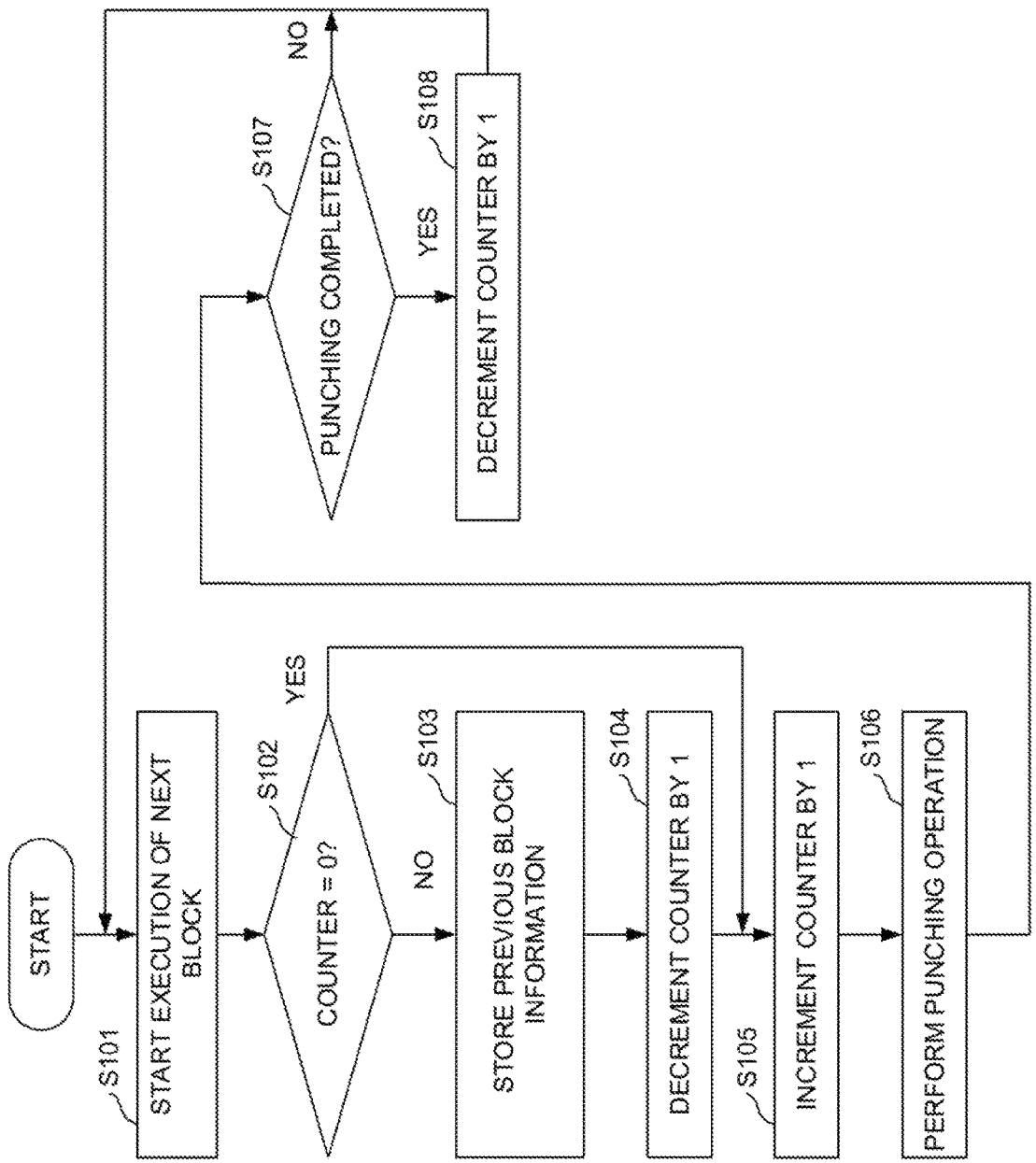
FIG. 3 is a flowchart showing an example of an operation at the time of occurrence of an error.

The following is a description, with reference to the flowchart of FIG. 3, of processing in which the punching executor 101, the punching error detector 102, and the re-punching information storage 103 detect an error-generated block and store information related to this block.

Step S101: The punching executor 101 has a function of sequentially executing the blocks described in the machining program. In this step, the punching executor 101 identifies the block to be executed next (hereinafter referred to as the next block) and starts the execution.

Step S102: Prior to the execution of a punching operation, the re-punching information storage 103 refers to the counter. If the counter value is 0, the processing proceeds to Step S105. If the counter value is any other value than 0, the processing proceeds to Step S103.

Step S103: The re-punching information storage 103 collects various pieces of information (block end point coordinates, selected tool number, etc.) related to the execution of the previous block and stores them into a predetermined storage area. These pieces of information are necessary for re-execution of a block in which an error is generated.

Step S104: The re-punching information storage 103 decrements the counter by 1 or resets it.

Step S105: The punching error detector 102 increments the counter by 1.

Step S106: The punching executor 101 performs the punching operation.

Step S107: The punching error detector 102 determines, by a known art, whether or not the punching operation in Step S106 is normally completed. If the operation is normally completed, the processing proceeds to Step S108. If an error is generated, the processing proceeds to Step S101 without the execution of Step S108.

Step S108: The re-punching information storage 103 decrements the counter by 1 or resets it.

<Operation for Re-Machining>

Figure 4:
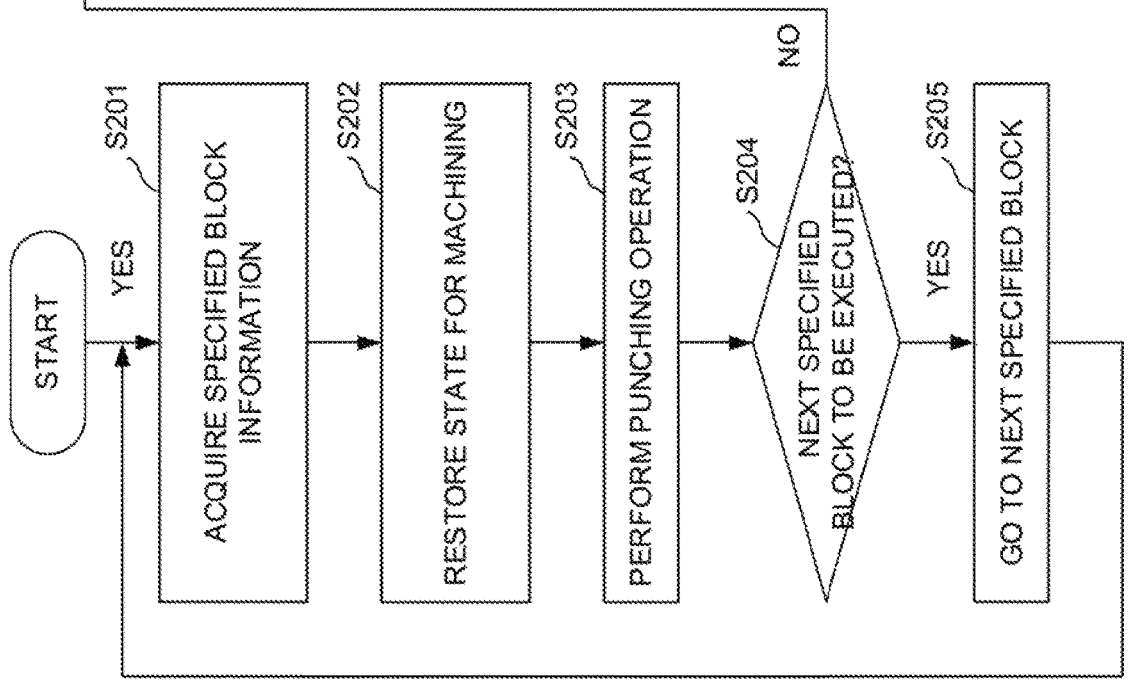
FIG. 4 is a flowchart showing an example of a re-punching operation.

The following is a description, with reference to the flowchart of FIG. 4, of an example of processing in which the re-punching executor 104 performs the punching again for the error-generated block. Typically, this flow is executed after suspension or termination of machining.

Step S201: The re-punching executor 104 refers to the information related to the error-generated block stored by the re-punching information storage 103 in Step S103 above and displays an error-generated block list screen such as the one shown in FIG. 6. A plurality of error-generated blocks are displayed on the screen and can be arranged so that one or more of the displayed blocks can be selected and specified by the user. The re-punching executor 104 acquires one or more error selection blocks selected and specified by the user. Examples of the information acquired by the re-punching executor 104 include the end point coordinates, selected tool number, and the like.

Step S202: The re-punching executor 104 restores the state for machining based on the information related to the error-generated block stored by the re-punching information storage 103 in Step S103 above, in order to re-execute the block(s) acquired in Step S201. For example, an XY-axis is located in the end point coordinates of the error-generated block and an operation is performed to select the tool number having then been selected.

Step S203: The re-punching executor 104 performs the punching operation.

Step S204: When a re-punching operation for all the error-generated blocks selected in Step S201 is completed, the processing proceeds to Step S206. If there is any error-generated block in which re-machining is not completed, the processing proceeds to Step S205.

Step S205: The processings of Step S201 and its subsequent Steps are repeated so that all the selected error-generated blocks are re-punched.

Step S206: If the operation is performed by the re-punching executor 104 after suspension of machining, the processing proceeds to Step S207. The processing is terminated in other cases, for example, if the operation is performed by the re-punching executor 104 after termination of machining.

Step S207: The machining is restarted after the XY-axis and the selected tool are restored to their states for the suspension of machining.

Advantageous Effects

According to the present embodiment, if the punching operation suffers an error due to any external factors during the execution of the machining program, the block information (end point coordinates, selected tool number, etc.) required for the re-execution of the error-generated block is automatically stored. When the re-punching operation is activated, the state at the time of occurrence of the error is automatically restored using the above block information having been stored, and only the punching operation at the location of occurrence of the error is re-executed. Thus, it is unnecessary for the operator to calculate the position coordinates of the location of occurrence of the error by coordinate computation or the like in person, thereby restoring the state (such as XY-axis coordinates and selected tool) during the machining.

Moreover, according to the present embodiment, even if a plurality of errors are generated during the machining, the block information concerned can be stored every time an error is generated so that necessary items in the stored information can be selected and activated at the time of re-punching. Furthermore, the re-punching can be performed at a plurality of selected spots. Thus, burden on the operator can be further reduced.

While the main embodiment of the present invention has been described herein, the invention is not limited to the above embodiment and may be suitably modified and embodied in various forms.

The invention claimed is:

1. A numerical controller controlling punching, the numerical controller comprising:
   a punching executor performing the punching according to a machining program;
   a punching error detector detecting a phenomenon that the punching is not normally completed;
   a re-punching information storage collecting and storing information required for re-execution of a block that the phenomenon is generated; and
   a re-punching executor restoring a machining state at the time of occurrence of the phenomenon and re-executing the punching by using the information,
   wherein the numerical controller is configured to:
   increment, by the punching error detector, a counter value from a predetermined value at a start of a block where punching is commanded in the machining program,
   decrement, by the punching error detector, the counter value back to the predetermined value when the punching is performed normally in the block, check, by the punching error detector, the counter value before the start of the block, and when the checked counter value is not the predetermined value, determine that an error has occurred in a previous block, and store, in the re-punching information storage, the information required for re-execution of the previous block.

2. The numerical controller according to claim 1, wherein the information includes a selected tool and/or end point coordinates of the block that the phenomenon is generated.

3. The numerical controller according to claim 1, wherein the re-punching information storage collects and stores the information related to a plurality of blocks that the phenomenon is generated during the punching by the punching executor, and wherein the re-punching executor re-executes the punching for that one of the plurality of blocks selected by a user.

4. The numerical controller according to claim 1, wherein the re-punching executor re-executes the punching after suspension or termination of the punching by the punching executor.

* * * * *